June 29, 1926.
T. H. WRIGHT
ELECTRIC MONORAIL ENGINE
Filed Sept. 15, 1922
1,590,610
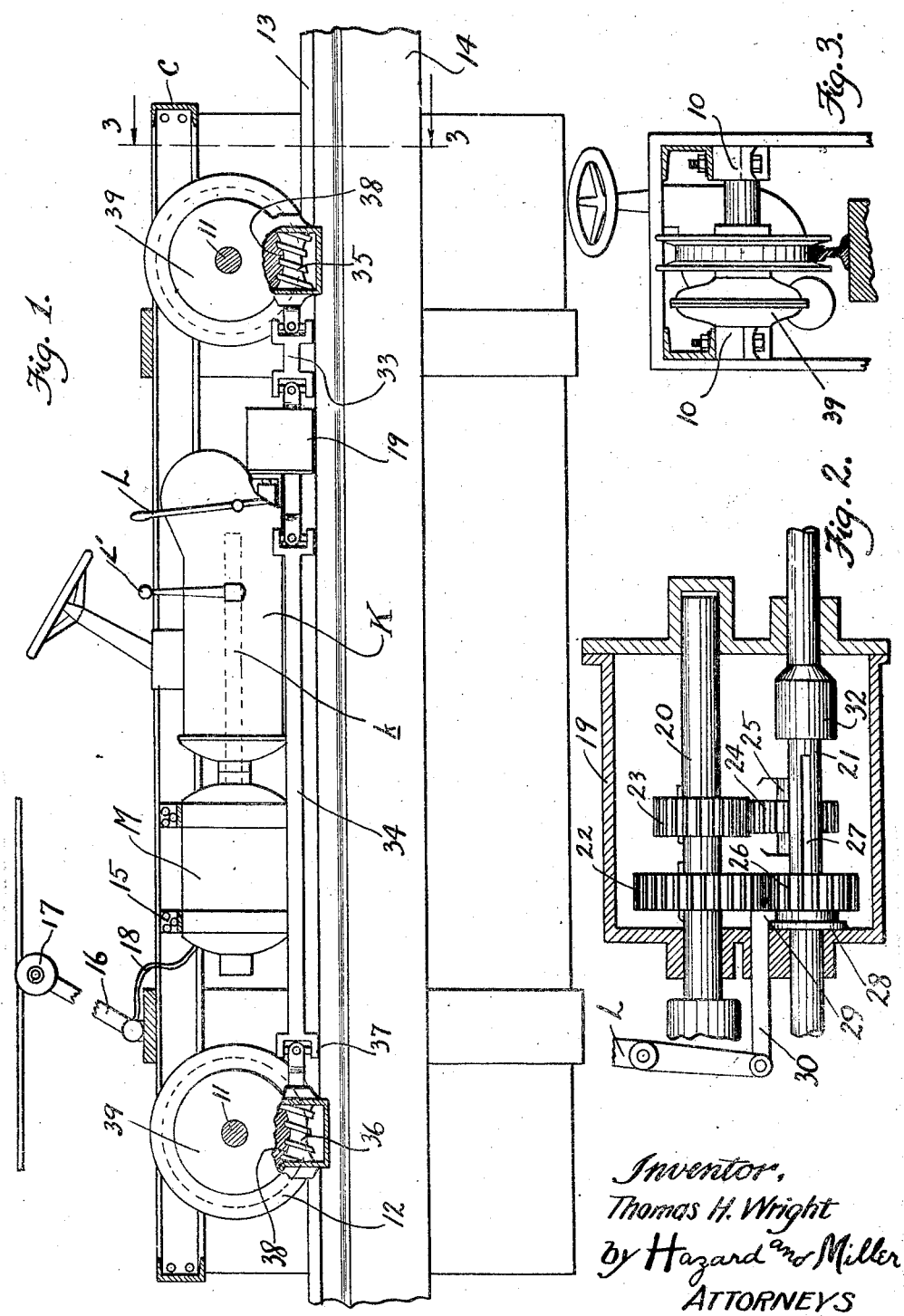
Inventor,
Thomas H. Wright
by Hazard and Miller
ATTORNEYS Patented June 29, 1926.

1,590,610

UNITED STATES PATENT OFFICE.

THOMAS H. WRIGHT, OF LOS ANGELES, CALIFORNIA.

ELECTRIC MONORAIL ENGINE.

Application filed September 15, 1922. Serial No. 588,431.

My invention relates to mono-rail cars or vehicles, and more particularly to driving means therefor, a purpose of my invention being the provision of a driving means including an electric motor adapted for direct association with a transmission mechanism and adapted to be supplied with current from a third rail or trolley wire associated with the mono-rail track over which the car is adapted to move.

Although I will describe only one form of driving mechanism, and will point out the novel features thereof in claim, it is to be understood that various changes and modifications may be made without departing from the spirit of the invention and the spirit and scope of the appended claim.

In the accompanying drawings,

Figure 1 is a view showing in side elevation and partly in section one form of mono-rail vehicle having applied thereto one form of reversing mechanism embodying my invention;

Figure 2 is a sectional view of the reversing mechanism shown in Figure 1;

Figure 3 is a vertical sectional view taken on the line 3—3 of Figure 1.

Referring specifically to the drawings, in which similar reference characters refer to similar parts, my invention, in its present embodiment, is shown as applied to a mono-rail car or locomotive including a chassis C and a transmission casing K with a lever L' adapted for the actuation of the transmission in obtaining the various speeds. The chassis C is provided at its forward and rear ends with bearings 10 in which are journaled shafts 11 carrying grooved wheels 12 adapted to move over a mono-rail 13 supported upon a base 14. Both of the shafts are adapted to be driven from an electric motor designated at M, and which is shown as sustained upon the chassis C by means of brackets 15. Current is supplied to the motor M in any suitable manner. In the present instance, I have shown a trolley pole 16 provided with a wheel 17 adapted for engagement with a trolley wire and electrically connected to the motor by conductors 18. The shaft of the motor M is directly connected to the main shaft $k$ of the transmission mechanism K.

For transmitting the motion of the transmission mechanism K to the wheels 12 of the locomotive so as to drive the wheels, and consequently the locomotive, in either direction upon a mono-rail 13, a reversing mechanism housed in a casing 19 is provided. This reversing mechanism as shown in Figure 2 is of the same construction as the reversing mechanism embodied in my copending application Serial No. 588,429, filed September 15, 1922, and comprises shafts 20 and 21, with the shaft 20 operatively connected at one end to one of the shafts of the transmission mechanism contained in the casing K. Gears 22 and 23 are keyed to the shaft 20, and the gear 23 meshes with a gear 24 fixed to a stub shaft 25. The gear 22 is adapted to mesh with the gear 26 slidable on the shaft 21 and rotatable therewith through the medium of a rib or projection 27. The gear 26 is manually movable to engage either of the gears 22 or 24 by means of a collar 28 engaged by a yoke 29 formed on one end of an arm 30. The arm 30 is slidable within the casing 19 and is pivotally connected to the lower end of a lever L. The shaft 21 is provided with an annular shoulder 32 for limiting the inward movement of the gear 26, and this shouldered end of the shaft is connected to a counter shaft 33. The opposite end of the shaft 21 is adapted for connection to a shaft 34, and the shafts 33 and 34 are operatively connected to worms 35 and 36, respectively. Universal joints 37 are provided between the several shafts 33 and 34, and the worms 35 and 36. The worms 35 and 36 mesh with worm gears 38 fixed to the shafts 11 and disposed within casings 39.

In practice, current supplied to the motor M from the trolley wire energizes the motor to operate the transmission shaft $k$, and from the transmission mechanism power is conveyed to the reversing mechanism within the casing 19. Through the medium of the reversing mechanism, and the shafts 33 and 34, as well as the worms and worm gears, the locomotives can be driven at various speeds and in either direction upon the mono-rail 13. It will be understood that by manipulation of the lever L the reversing mechanism can be set to drive the locomotive forwardly or rearwardly.

I claim as my invention:

In a mono-rail locomotive, an electric motor, a speed change transmission driven by said electric motor, a drive shaft delivering power from said speed change transmission, pinions keyed to said drive shaft, a reverse gear engaged by one of said pinions, a driving shaft parallel to the drive shaft and gearedly connected to the front and back wheels of the locomotive, and a gear shiftably keyed to said driving shaft and adapted to engage the other of said pinions or said reverse gear.

In testimony whereof I have signed my name to this specification.

THOMAS H. WRIGHT.